US010642127B1

(12) United States Patent
Simanovski et al.

(10) Patent No.: US 10,642,127 B1
(45) Date of Patent: May 5, 2020

(54) SINGLE CRYSTAL OPTICAL PARAMETRIC AMPLIFIER

(71) Applicant: Coherent, Inc., Santa Clara, CA (US)

(72) Inventors: Dmitri Simanovski, Santa Clara, CA (US); Andrei Starodoumov, Santa Clara, CA (US); Norman Hodgson, Santa Clara, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 16/408,289

(22) Filed: May 9, 2019

(51) Int. Cl.
*G02F 1/39* (2006.01)
*G02F 1/355* (2006.01)
*G02F 1/37* (2006.01)

(52) U.S. Cl.
CPC .............. *G02F 1/39* (2013.01); *G02F 1/3551* (2013.01); *G02F 1/37* (2013.01); *G02F 2001/392* (2013.01)

(58) Field of Classification Search
CPC ......... G02F 1/37; G02F 1/39; G02F 2001/392
See application file for complete search history.

(56) References Cited

U.S. PATENT DOCUMENTS

| | | | | |
|---|---|---|---|---|
| 6,288,832 B1 * | 9/2001 | Richman | .................... | G02F 1/37 359/326 |
| 6,930,821 B2 * | 8/2005 | Kurz | ..................... | G02F 1/3775 359/326 |
| 7,106,498 B2 * | 9/2006 | Pan | ........................... | G02F 1/39 359/326 |
| 7,292,387 B2 * | 11/2007 | Hoffman | ............... | G02F 1/3534 356/326 |
| 8,441,720 B2 * | 5/2013 | Borguet | ................ | G02F 1/3544 359/326 |
| 9,647,407 B1 * | 5/2017 | Qian | ..................... | H01S 3/1625 |

OTHER PUBLICATIONS

Aleksandrovski et al., "Realization of Quasi-Phase-Matched Parametric Interactions of Waves of Multiple Frequencies with Simultaneous Frequency Doubling", Journal of Russian Laser Research, vol. 18, No. 2, 1997, pp. 101-106.

(Continued)

*Primary Examiner* — Rhonda S Peace
(74) *Attorney, Agent, or Firm* — Morrison & Foerster LLP (57) ABSTRACT

An apparatus for generating visible light including a laser source emitting a fundamental beam, an optically nonlinear crystal, and a seed source emitting a seed beam. The optically nonlinear crystal receives the fundamental beam. The fundamental beam propagates in the nonlinear crystal at a first phase-matching angle for second-harmonic generation. A portion of the fundamental beam is converted into a second-harmonic beam that propagates in the nonlinear crystal at the first phase-matching angle for optical parametric generation. The seed source emits a seed beam having a wavelength longer than the second-harmonic beam. The seed beam is directed into the nonlinear crystal and propagates at a second phase-matching angle for the optical parametric amplification. A portion of the second-harmonic beam is converted into a signal beam at the seed wavelength and an idler beam by the optical parametric amplification.

19 Claims, 5 Drawing Sheets

(56) References Cited

OTHER PUBLICATIONS

Aytür et al., "Plane-Wave Theory of Self-Doubling Optical Parametric Oscillators", IEEE Journal of Quantum Electronics, vol. 34, No. 3, Mar. 1998, pp. 447-458.

Bromage et al., "Analysis and Suppression of Parasitic Processes in Noncollinear Optical Parametric Amplifiers", Optics Express, vol. 19, No. 18, Aug. 29, 2011, pp. 16797-16808.

Jensen et al., "Yellow Nanosecond Sum-Frequency Generating Optical Parametric Oscillator using Periodically Poled LiNbO3", Applied Physics B, vol. 91, No. 1, 2008, pp. 1-12.

Kartaloğlu et al., "Simultaneous Phase Matching of Optical Parametric Oscillation and Second-Harmonic Generation in Aperiodically Poled Lithium Niobate", Journal of the Optical Society of America B, vol. 20, No. 2, Feb. 2003, pp. 343-350.

Kishimoto et al., "Periodically Poled LiNbO3 Ridge Waveguide with 21.9 dB Phase-Sensitive Gain by Optical Parametric Amplification", Optical Fiber Communication Conference, 2017, 3 pages.

Petrov et al., "Frequency Upconversion of Tunable Femtosecond Pulses by Parametric Amplification and Sum-Frequency Generation in a Single Nonlinear Crystal", Optics Letter, vol. 20, No. 21, Nov. 1, 1995, pp. 2171-2173.

Prakash et al., "Collinear Broadband Optical Parametric Generation in Periodically Poled Lithium Niobate Crystals by Group Velocity Matching", Applied Physics B, vol. 92, No. 535-541., 2008, pp. 535-541.

Xie, Xiuping, "High Gain Parametric Processes in Quasi-Phase-Matching Proton-Exchange Lithium Niobate Waveguides", The Department of Applied Physics and the Committee on Graduate Studies of Stanford University, Sep. 2006, 146 pages.

Xu et al., "Frequency Self-Doubling Optical Parametric Amplification: Noncollinear Red-Green-Blue lightsource generation based on a Hexagonally Poled Lithium Tantalate", Optics Letters, vol. 33, No. 23, Dec. 1, 2008, pp. 2791-2793.

Zhang, Xinping, "High-Repetition-Rate Femtosecond Optical Parametric Oscillators Based on KTP and PPLN", dem Fachbereich Physik der Philipps-Universität Marburg, 2002, 195 pages.

\* cited by examiner

SINGLE CRYSTAL OPTICAL PARAMETRIC AMPLIFIER

TECHNICAL FIELD OF THE INVENTION

The present invention relates in general to amplifying a beam of laser-radiation. The invention relates in particular to converting power from a fundamental beam of radiation to a beam being amplified using a nonlinear optical crystal.

BACKGROUND

Diode-pumped lasers having solid-state gain media incorporating ytterbium ions ($Yb^{3+}$), neodymium ions ($Nd^{3+}$), or titanium ions ($Ti^{3+}$) generate laser radiation at near-infrared wavelengths with very high efficiencies. This near-infrared laser radiation is often referred to as "fundamental" laser radiation by practitioners of the laser art. Lasers are commercially available for generating fundamental laser radiation over a broad parameter space. Industrial fiber lasers having $Yb^{3+}$ doped optical fibers in serial arrangements can produce beams of continuous wave laser radiation at a wavelength of about 1 micrometer (μm) and at kilowatt average powers. Industrial ultrafast lasers having $Yb^{3+}$ doped optical fibers can produce pulses of laser radiation at megahertz (MHz) repetition rates and with compressed pulse durations from hundreds of femtoseconds (fs) to tens of picoseconds (ps). Ultrafast lasers having $Ti^{3+}$ doped sapphire slabs in multi-pass arrangements can produce pulses of laser radiation at wavelengths of about 800 nanometers (nm) and at pulse energies exceeding 1 millijoule, with compressed pulse durations of tens of femtoseconds.

Nonlinear optical processes in nonlinear optical materials are used to convert fundamental radiation to other wavelengths that are useful in particular applications. Some wavelengths are accessed using cascaded nonlinear optical processes in a series of nonlinear materials. In harmonic generation processes, new wavelengths are created corresponding to frequencies that are harmonics of the frequency $\omega_F$ of the fundamental laser beam. For example, in a second-harmonic generation (SHG) process, pairs of photons in a fundamental laser beam are converted into photons in a second-harmonic beam having a frequency $\omega_{SH}=2\omega_F$. In an optical parametric amplification (OPA) process, a "pump" laser beam having a frequency $\omega_P$ is converted into a "signal" beam having a frequency $\omega_S$ and an "idler" beam having another frequency $\omega_I$, with $\omega_P=\omega_S+\omega_I$ to conserve energy. Although optical parametric amplification can begin spontaneously, the overall efficiency can be improved by injecting a low-power "seed" beam having the signal frequency $\omega_S$ into the nonlinear material, which is amplified by the OPA process. The optical parametric amplification process transfers power from the pump beam to the seed beam, thereby amplifying the seed beam, which becomes the signal beam. Usually, nonlinear optical materials in commercial lasers are birefringent crystals. Momentum conservation is achieved by careful selection of the polarizations and propagation directions of the interacting beams with respect to the crystallographic axes. This selection is known as "phase matching" by practitioners of the art.

Optical parametric amplification processes using a fundamental beam as the pump beam ($\omega_P=\omega_F$) are used to generate signal and idler beams having desired infrared wavelengths. To generate beams having visible or near-infrared wavelengths, a cascaded process having two nonlinear stages may be used. In a first stage, second-harmonic generation in a first nonlinear crystal generates a second-harmonic beam. In a second stage, optical parametric amplification in a second nonlinear crystal uses the second-harmonic beam as the pump beam ($\omega_P=\omega_{SH}$). A seed beam is also injected into the second nonlinear crystal with a frequency selected to produce signal and idler beams having the desired visible or near-infrared wavelengths. Ultrashort pulses from ultrafast lasers have high-peak powers for efficient nonlinear conversion in SHG and OPA processes.

Figure 1:
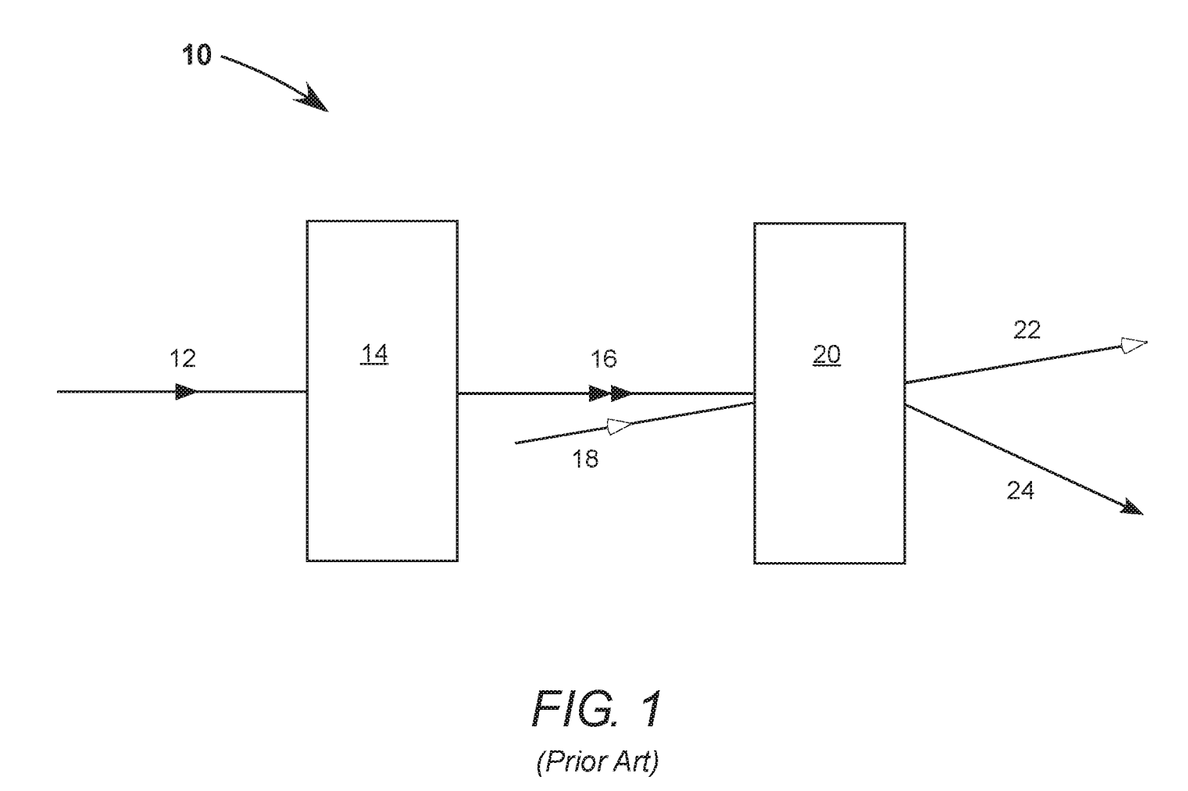
FIG. 1 schematically illustrates a prior-art apparatus for generating visible or near-infrared laser radiation, including a first nonlinear crystal for converting a fundamental laser beam into a second-harmonic laser beam and a second nonlinear crystal for converting the second-harmonic laser beam into an amplified seed beam.

FIG. 1 schematically illustrates an example of such a prior-art apparatus 10 for generating a visible or near-infrared beam of laser radiation. A fundamental laser beam 12 is converted into a second-harmonic laser beam 16 in a first nonlinear crystal 14 by second-harmonic generation. Second-harmonic beam 16 and a seed laser beam 18 are directed into a second nonlinear crystal 20, wherein seed beam 18 is amplified by optical parametric amplification. A signal beam 22 and an idler beam 24 are thereby generated. Seed beam 18 has the signal beam frequency ɷs. Sources of fundamental beam 12 and seed beam 18 are not depicted for convenience of illustration. Orientations of the crystallographic axes with respect to the surfaces of the nonlinear crystals and the angles-of-incidence of the respective beams on those surfaces are selected to phase match the two nonlinear processes. It should be noted, in general, that an OPA process requires a non-collinear arrangement of beams for phase matching. Non-collinear angles between beams inside a crystal correspond to larger non-collinear angles outside the crystal due to refraction.

By way of example, a fundamental beam having a spectrum spanning a wavelength range 1020-1080 nm, produced by an ultrafast laser with a $Nd^{3+}$ doped glass as the gain medium, is converted into a green second-harmonic beam spanning a range 510-540 nm. A seed beam having a red wavelength of 700 nm is then amplified, producing an infrared idler beam spanning a range 1880-2360 nm. Either the amplified red seed beam or the infrared idler beam could be used in an application of apparatus 10.

While pumping second crystal 20 by a second-harmonic beam allows for broad spectral tuning range, the overall efficiency of the SHG process in first crystal 14 is limited by back conversion, which is the conversion of second-harmonic radiation back into fundamental radiation by the same nonlinear process. Back conversion clamps the overall SHG efficiency at about 50% and thereby reduces the efficiency of apparatus 10 by about a factor of two.

There is need for less-complex and less-expensive apparatus for generating laser radiation in the visible and the infrared regions of the electromagnetic spectrum. Preferably, this apparatus would generate this laser radiation with higher efficiency than current apparatus.

SUMMARY OF THE INVENTION

An optical apparatus comprises a laser source, an optically nonlinear crystal, and a seed source. The laser source emits a fundamental beam. The optically nonlinear crystal receives the fundamental beam such that the fundamental beam propagates in the nonlinear crystal at a phase-matching angle for second-harmonic generation. A portion of the fundamental beam is converted into a second-harmonic beam and propagates in the nonlinear crystal at the first phase-matching angle for optical parametric generation. A seed source emits a seed beam having a wavelength longer than the second-harmonic beam. The seed beam is directed into the nonlinear crystal and propagates in the nonlinear crystal at a second phase-matching angle for optical parametric amplification. A portion of the second-harmonic beam is converted into a signal beam at the seed wavelength and an idler beam by the optical parametric amplification.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, explain principles of the present invention.

DETAILED DESCRIPTION OF THE INVENTION

The present invention provides simultaneous generation of a second-harmonic beam from a fundamental beam by SHG and amplification of a seed beam by OPA in the same nonlinear crystal. The second-harmonic beam becomes the pump beam in the OPA process. Both the SHG and OPA processes must be simultaneously phased matched for efficient amplification.

Figure 2:
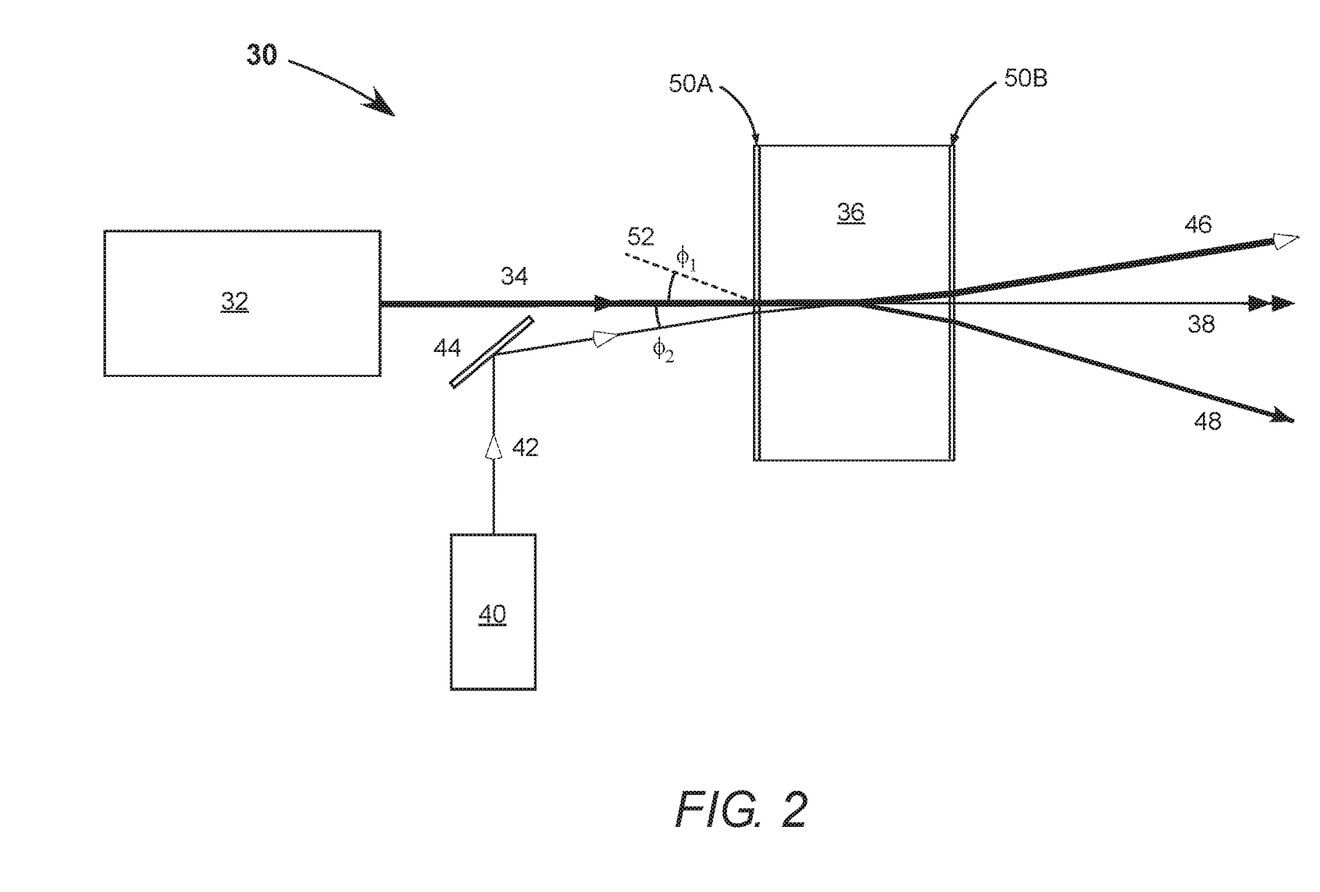
FIG. 2 schematically illustrates one embodiment of optical amplifier apparatus in accordance with the present invention for amplifying a seed beam at a signal wavelength, including an optically nonlinear crystal that receives a fundamental beam and the seed beam, wherein power in the fundamental beam is transferred to the seed beam and an idler beam via generation of a second-harmonic beam.

FIG. 2 schematically illustrates one embodiment of optical amplifier apparatus 30 in accordance with the present invention. A laser source 32 generates a fundamental beam 34 having a fundamental wavelength. An optically nonlinear crystal 36 is arranged to receive fundamental beam 34. Fundamental beam 34 is incident on an input surface of nonlinear crystal 36 at a first external angle $\varphi_1$ selected for phase matching an SHG process. External and internal angles are defined with respect to crystallographic axes of nonlinear crystal 36, as discussed further below. Here, nonlinear crystal 36 has been fabricated such that fundamental beam 34 is incident at a normal angle of incidence on the input surface. A portion of the fundamental beam is converted into a second-harmonic beam 38 as it propagates through nonlinear crystal 36. Second-harmonic beam 38 has a second-harmonic wavelength that is half the fundamental wavelength. Fundamental beam 34 and second-harmonic beam 38 propagate collinearly within nonlinear crystal 36, except for any spatial "walk-off" of the second-harmonic beam due to birefringence. Any residual fundamental beam or residual second-harmonic beam emerges from an opposite output surface of the nonlinear crystal.

A seed source 40 generates a seed beam 42 having a seed wavelength that is longer than the second-harmonic wavelength. Seed beam 42 is incident on an optional mirror 44 that directs the seed beam onto the input surface of nonlinear crystal 36. The seed wavelength is selected to be a signal wavelength of a phase-matched OPA process that converts power in second-harmonic beam 38 to power in seed beam 42. A portion of the second-harmonic beam is converted into the seed beam as these beams propagate through the crystal, generating a signal beam 46, which is the amplified seed beam. This OPA process requires substantial overlap between these beams in the nonlinear crystal to be efficient. Seed beam 42 is incident on the input surface of nonlinear crystal 36 at a second external angle $\varphi_2$ selected for phase matching the OPA process. Second external angle $\varphi_2$ is a non-collinear angle between fundamental beam 34 and seed beam 42. For an OPA process, the non-collinear angle is generally small, less than a few degrees, e.g. 5 degrees, which is why mirror 44 is useful. A heavy line is used to indicate that power is transferred from fundamental beam 34 to signal beam 46. Power is also transferred from fundamental beam 34 to an idler beam 48 having an idler wavelength. The signal beam and idler beam emerge from the output surface, diverging from each other and any residual fundamental beam or residual second-harmonic beam.

Nonlinear crystal 36 includes a first anti reflection coating 50A on the input surface and a second anti-reflection coating 50B on the output surface. First anti-reflection coating 50A is highly-transmissive at the fundamental and seed wavelengths. Since second external angle $\varphi_2$ is small, fundamental beam 34 and seed beam 42 are both at close to normal angle-of-incidence on the input surface, which simplifies the design of anti-reflection coating 50A. Second anti-reflection coating 50B is highly-transmissive at the signal wavelength. If idler beam 48 is to be used in an application, anti-reflection coating 50B is preferably also highly-transmissive at the idler wavelength. If the residual fundamental and second-harmonic beams have significant power, anti-reflection coating 50B is most-preferably highly-transmissive at the fundamental and second-harmonic wavelengths as well.

Figure 3:
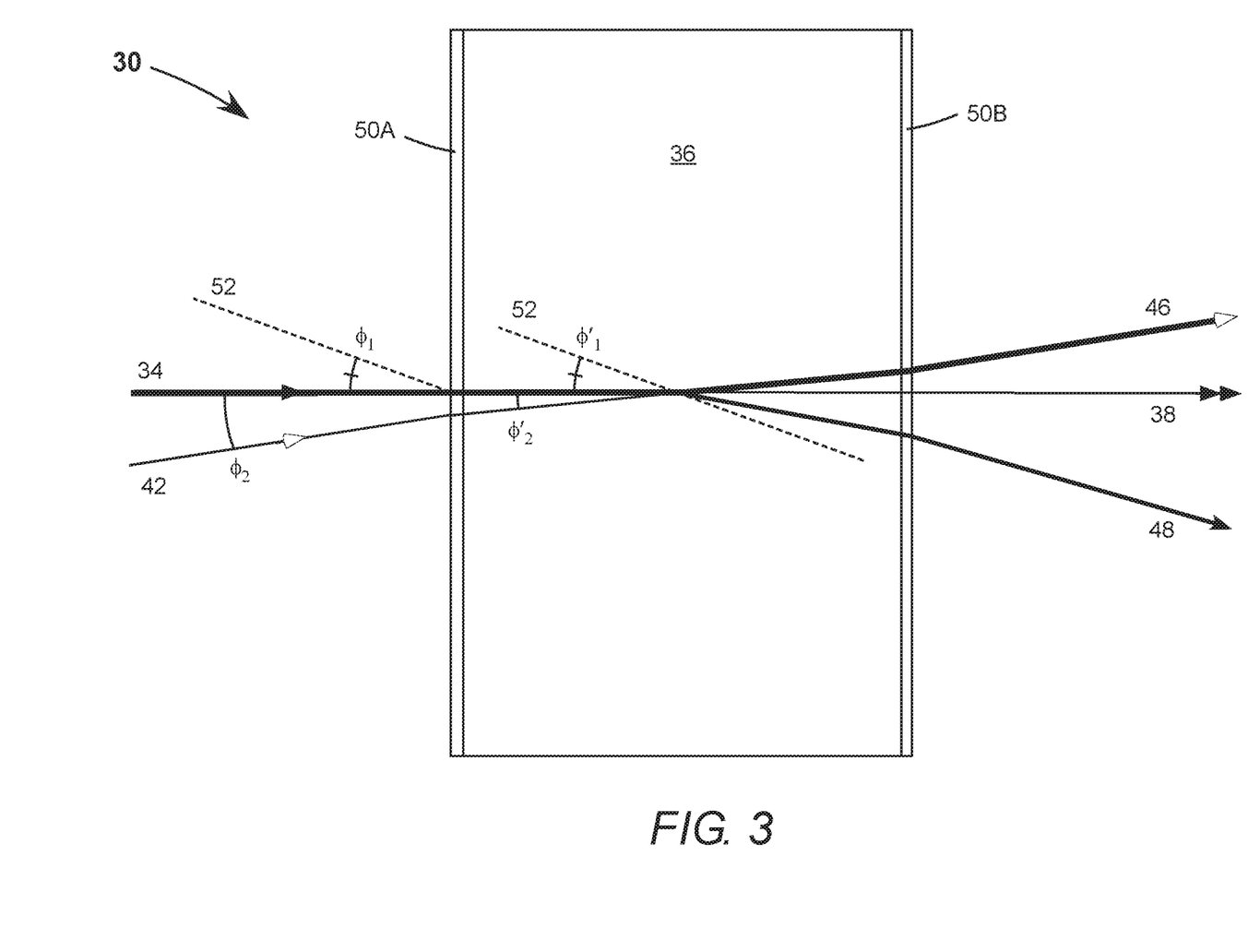
FIG. 3 schematically illustrates additional details of the amplifier apparatus of FIG. 2.

FIG. 3 illustrates additional details of amplifier apparatus 30 of FIG. 2. First external angle $\varphi_1$ corresponds to a first internal angle $\varphi'_1$ of fundamental beam 34 with respect to a crystallographic axis 52. Here, external angle $\varphi_1$ and internal angle $\varphi'_1$ are the same, because of the selection of surface orientations with respect to the crystallographic axes in fabricating nonlinear crystal 36. Second external angle $\varphi_2$ corresponds to a second internal angle $\varphi'_2$. As discussed above, first internal angle $\varphi'_1$ was selected for phase matching the SHG process and second internal angle $\varphi'_2$ was selected for simultaneously phase matching the OPA process. It should be noted that the second angle is defined with respect to the first angle, therefore the second angle is also defined with respect to the crystallographic axes, such as crystallographic axis 52.

The overall efficiency of the SHG process corresponds to the portion of fundamental beam 34 that is converted to second-harmonic beam 38. Any unconverted portion of fundamental beam 34 becomes the residual fundamental beam. The overall efficiency of the OPA process corresponds to the portion of the second-harmonic beam 38 that is converted to signal beam 46 and idler beam 48. Any unconverted portion becomes the residual second-harmonic beam. The overall efficiency of the simultaneous SHG and OPA processes corresponds to the portion of fundamental beam 34 that is converted to signal beam 46 and idler beam 48.

As mentioned above, the OPA process requires substantial overlap between second-harmonic beam 38 and seed beam 42 for efficient amplification. Although the beams in FIGS. 2 and 3 are depicted as rays, essentially center rays of each beam, these beams have cross-sectional areas and diameters. In some embodiments, particularly those using beams of ultrashort pulses, it is not necessary to focus fundamental beam 34 and seed beam 42 to achieve the high intensities required for efficient SHG and OPA. The beam diameters can be scaled to optimize efficiency and overlap volume, but without exceeding a damage threshold of nonlinear crystal 36 or anti-reflection coatings 50A and 50B. In practice, this scaling can be achieved using simple telescopes to increase or decrease the diameters of the collimated beams. In other embodiments, it is necessary to focus these beams in nonlinear crystal 36, thereby increasing intensity for an efficient overall process. Those skilled in the art would be familiar with these considerations when optimizing nonlinear optical processes and further description thereof is not necessary for understanding the principles of the present invention.

In operation, fundamental beam 34 is converted into second-harmonic beam 38 as it propagates through nonlinear crystal 36 and the second-harmonic beam in turn is converted into signal beam 46 and idler beam 48 as it propagates through the nonlinear crystal. The SHG and OPA processes occur simultaneously, with the OPA process depleting the second-harmonic beam as it is being generated by the SHG process. This continuous depletion of the second-harmonic beam minimizes back conversion in the SHG process and thereby substantially increases the overall efficiency of the simultaneous SHG and OPA processes. A high ratio of power in the fundamental beam to power in the second-harmonic beam is maintained while these beams propagate through the crystal. Minimizing back conversion by continual depletion of the second-harmonic beam is an advantage of the inventive optical amplifier over less-efficient conventional apparatus, such as that of FIG. 1, which have a dedicated crystal for the SHG process. It should be noted that the comparatively large divergence angle of idle beam 48 mitigates back conversion in the OPA process. Another advantage of the inventive optical amplifier is that it has a simpler design and few components than the prior-art apparatus.

For a fundamental wavelength of about 1 μm, suitable materials for nonlinear crystal 36 include but are not limited to β-barium borate (BBO), lithium tetraborate (LBO), bismuth borate (BIBO), potassium dihydrogen phosphate (KDP), and deuterated potassium dihydrogen phosphate (DKDP). BBO and LBO support type-1 SHG processes and can be simultaneously phase-matched for both SHG and OPA processes in accordance with the present invention. For SHG at a temperature of 25° C., first internal angle $\varphi'_1$ for an exemplary fundamental wavelength of 1035 nm is 13.2° and 23.3°, in respectively BBO and LBO. First internal angle $\varphi'_1$, here, is the angle between the crystallographic axis 52 and fundamental beam 34. The corresponding second-harmonic wavelength is about 517.5 nm.

A working example of amplifier apparatus 30 was built and tested at these exemplary wavelengths. Nonlinear crystal 36 was made of BBO and had a thickness in the beam propagation direction of about 4 mm. The fundamental beam had a pulse duration of about 400 fs, a pulse energy of about 50 millijoules, and an average power of about 10 watts (W). A broad bandwidth seed beam centered at a wavelength of about 730 nm was amplified to about 1.0 W. To verify the simultaneous SHG and OPA processes, the seed beam was modulated on and off. The residual fundamental beam exhibited synchronous modulations of about 0.7 W and the residual second-harmonic beam exhibited synchronous modulations of about 1.0 W. Both the residual beams exhibited lower power when the seed beam was on, indicating that both the fundamental and second-harmonic beams were being depleted by the simultaneous processes.

Figure 4:
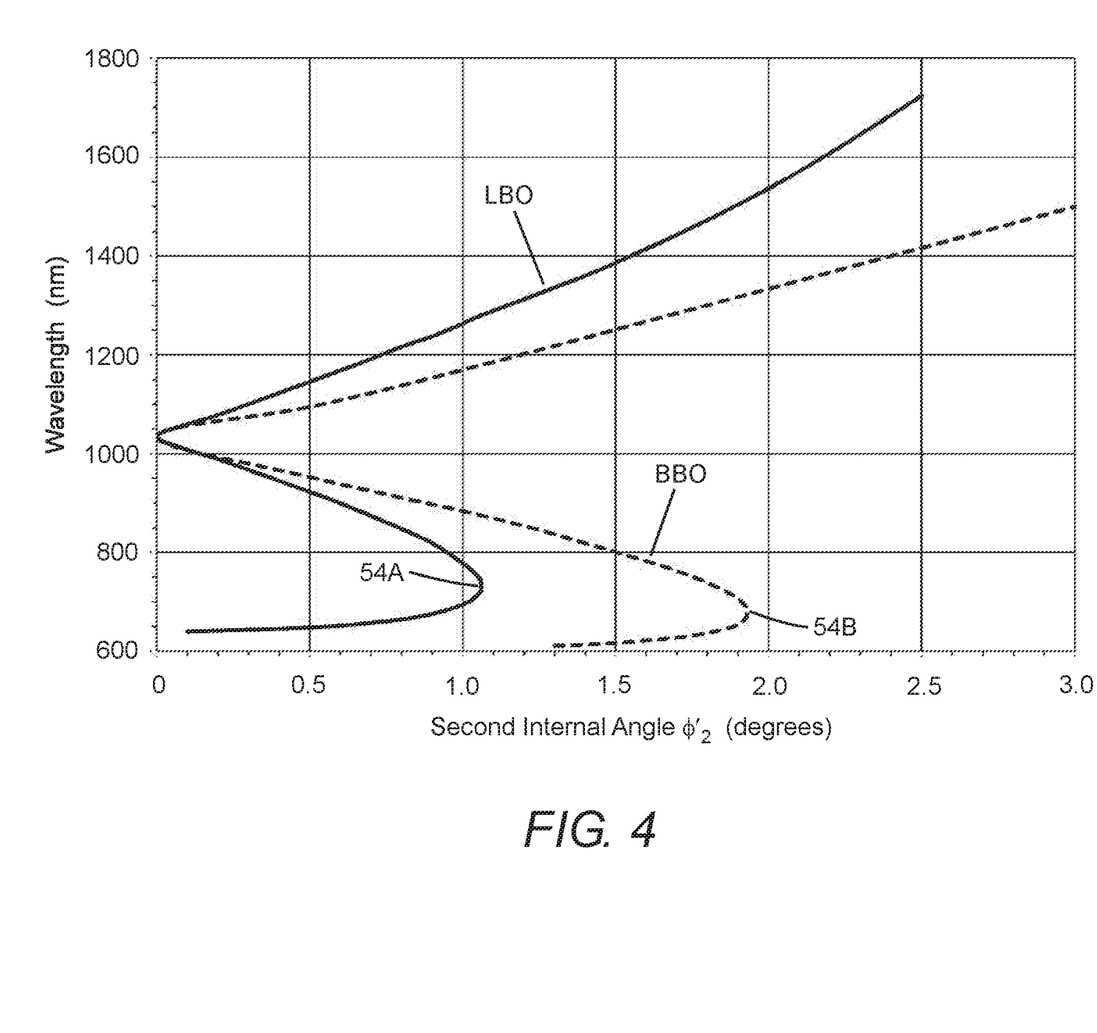
FIG. 4 schematically illustrates wavelength tuning curves in the optical amplifier of FIG. 2, for an exemplary second-harmonic wavelength of 517.5 nm and the optically nonlinear crystal made of LBO or BBO.

FIG. 4 is a graph schematically illustrating single wavelengths as a function of second internal angle $\varphi'_2$ for the exemplary pump wavelength of about 517.5 nm. The second-harmonic wavelength is the pump wavelength for the OPA process in amplifier apparatus 30 of FIGS. 2 and 3. FIG. 4 depicts tuning curves for phase-matched OPA in BBO and LBO. For each signal wavelength, there is a second internal angle $\varphi'_2$ to phase match the OPA process, which is the internal non-collinear angle between the signal beam and the collinear fundamental and second-harmonic beams. As expected, a degenerate process having equal signal and idler wavelengths is phased matched for the fundamental wavelength of about 1035 nm and $\varphi'_2=0°$.

The tuning curves span the same spectral ranges as non-collinear OPA processes in an equivalent conventional amplifier apparatus and span non-collinear phase-matching angles up to about 3°. The tuning curve of LBO has a turning point 54A at a signal wavelength of about 740 nm, while the tuning curve of BBO has a turning point 54B at a signal wavelength of about 680 nm. The OPA process is approximately phase matched over a comparatively broad range of signal wavelengths about each turning point. These turning points therefore allow for amplification of a signal beam having a broad spectral bandwidth and particularly a signal beam of ultrashort pulses.

Because first external angle $\varphi_1$ between fundamental beam 34 and crystallographic axis 52 is fixed by the phase matching of the SHG process, wavelength tuning of the OPA process is achieved by varying the seed wavelength and second external angle $\varphi_2$ between fundamental beam 34 and seed beam 42. For continuous tuning, the seed wavelength and second external angle $\varphi_2$ are varied synchronously. However, when operating near a turning point, wavelength tuning may be possible over a limited range of wavelengths by varying the seed wavelength only.

Figure 5:
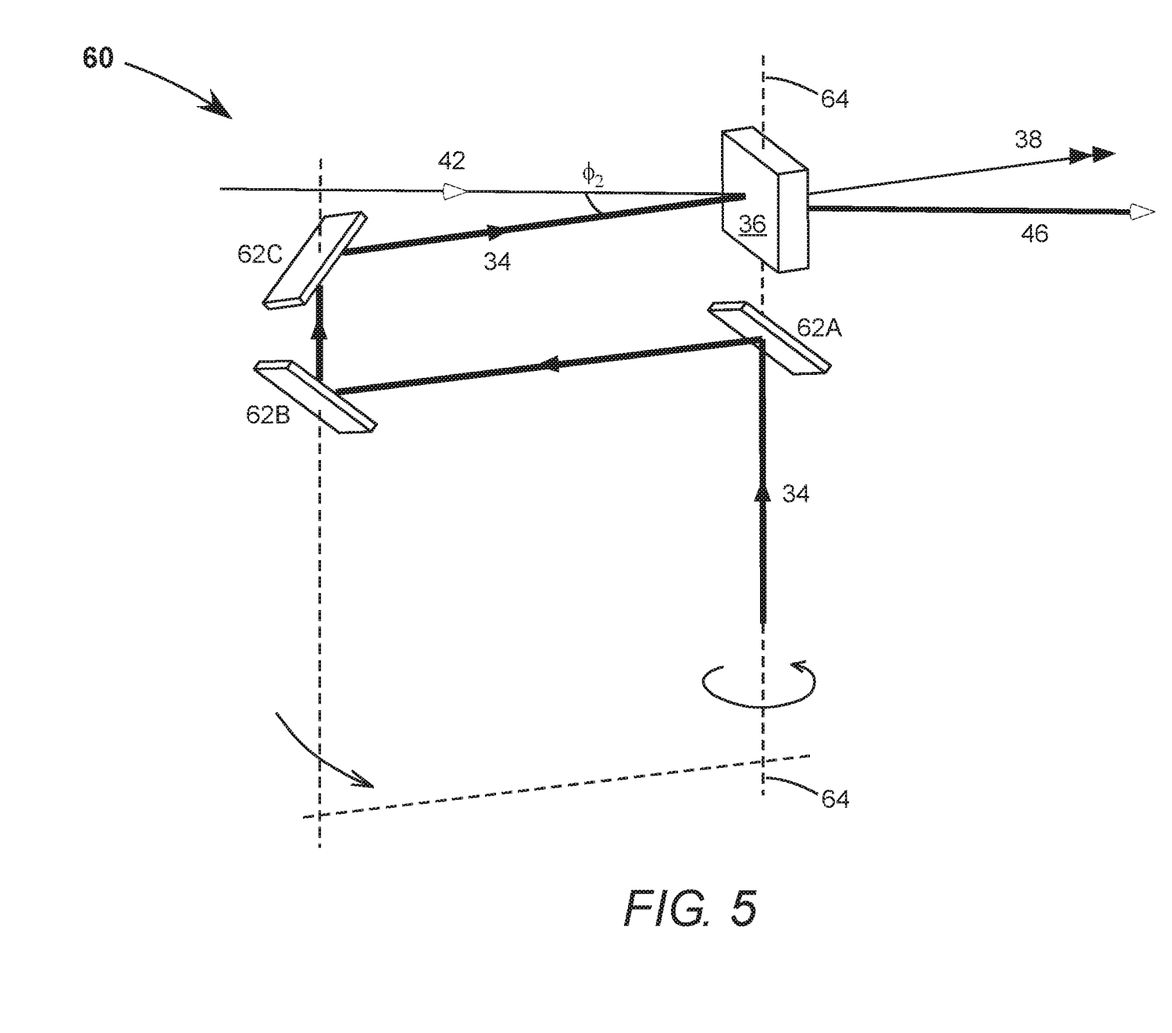
FIG. 5 schematically illustrates another embodiment of optical amplifier apparatus, similar to the amplifier apparatus of FIG. 2, but configured and arranged for continuous wavelength tuning.

FIG. 5 schematically illustrates another embodiment 60 of optical amplifier apparatus, similar to amplifier apparatus 30 of FIGS. 2 and 3, but configured and arranged for continuous wavelength tuning. Fundamental beam 34 is reflected by a series of routing mirrors 62A, 62B, and 62C that together intercept the fundamental beam and direct it onto the input surface of nonlinear crystal 36. Again, fundamental beam 34 is incident at a normal angle of incidence on the input surface, which is first external angle $\varphi_1$ with respect to a crystallographic axis 52. Again, seed beam 42 is incident at second external angle $\varphi_2$ with respect to fundamental beam 34 and the amplified signal beam 46 emerges from the output surface. The idler beam has been omitted for clarity of illustration.

Nonlinear crystal 36 and routing mirror 62A are located on a common axis of rotation 64. Fundamental beam 34 propagates along axis 64 onto routing mirror 62A. Axis 64 and routing mirrors 62B and 62C are located in a common plane. The arrangement of these elements along an axis and in a plane could be fixed by mounting them to a common structure (not shown), which could include a common base that rotates about axis 64. When wavelength tuning amplifier apparatus 60, nonlinear crystal 36 and routing mirrors 62A, 62B, and 62C all rotate together about axis 64. This maintains fundamental beam 34 at a constant first external angle $\varphi_1$, to maintain phase matching of the SHG process, while varying second external angle $\varphi_2$. The seed wavelength and second external angle $\varphi_2$ are varied synchronously to maintain operation on the tuning curve for the OPA process.

One or both of the signal and idler beams could be used in an application of the inventive amplifier. However, when amplifying a seed beam of ultrashort pulses, the idler beam will be dispersed over a comparatively large solid angle and a broad range of wavelengths. When incorporated into a chirped-pulse amplification (CPA) laser system, the inventive amplifier could be arranged to amplify temporally stretched pulse, prior to any compression.

It should be noted that the inventive amplifier could be operated by directing the seed beam into the nonlinear crystal at second external angle $\varphi_2$ on either side of the fundamental beam. However, in general, one side will have less spatial walk-off between the fundamental beam and the second-harmonic beam generated by the SHG process. That side will be favored for having an overall better efficiency, due to better overlap between the beams interacting in the nonlinear crystal.

The inventive amplifier could be the gain element in an optical parametric oscillator (OPO) by incorporating it into a resonator. The resonator would also include a high-reflecting mirror and an output-coupler mirror for the signal beam or idler beam. Preferably, the OPO would be seeded, but lasing may be initiated by spontaneous emission. An OPO is generally practical for pulse operation with pulse durations of nanoseconds or longer. An OPO is also practical for continuous wave (CW) operation.

If the overall conversion efficiency of the simultaneous SGH and OPA processes is relatively low and the unconverted portion of the fundamental beam is therefore relatively high, the residual fundamental beam and the amplified beam can be directed to another amplifier for further amplification. Alternatively, a plurality of the inventive amplifiers can be arranged serially, with the residual fundamental beam from one amplifier directed to a next amplifier to generate amplified beams having different wavelengths.

The inventive apparatus is described above with reference to the disclosed embodiments. The apparatus is not limited, however, to the embodiments described and depicted herein. Rather, the invention is limited only by the claims appended hereto.

We claim:

1. An optical amplifier apparatus comprising:
a laser source emitting a fundamental beam;
an optically nonlinear crystal arranged to receive the fundamental beam, the fundamental beam propagating in the nonlinear crystal at a phase-matching angle for second-harmonic generation, a portion of the fundamental beam converted into a second-harmonic beam that propagates in the nonlinear crystal at a first phase-matching angle for optical parametric generation; and
a seed source emitting a seed beam having a wavelength longer than the second-harmonic beam, the seed beam directed into the nonlinear crystal, the seed beam propagating in the nonlinear crystal at a second phase-matching angle for the optical parametric amplification, a portion of the second-harmonic beam converted into a signal beam at the seed wavelength and an idler beam by the optical parametric amplification.

2. The optical amplifier apparatus as in claim 1, wherein the optically nonlinear crystal supports type-1 second-harmonic generation.

3. The optical amplifier apparatus as in claim 2, wherein the optically nonlinear crystal is made of a material selected from a group consisting of β-barium borate (BBO), lithium tetraborate (LBO), bismuth borate (BIBO), potassium dihydrogen phosphate (KDP), and deuterated potassium dihydrogen phosphate (DKDP).

4. The optical amplifier apparatus as in claim 1, wherein the fundamental beam is incident at a normal angle of incidence on an input surface of the optically nonlinear crystal.

5. The optical amplifier apparatus as in claim 1, wherein the second phase-matching angle is a non-collinear angle between the fundamental beam and the seed beam.

6. The optical amplifier apparatus as in claim 5, the non-collinear angle being less than 5 degrees.

7. The optical amplifier apparatus as in claim 1, wherein the first phase-matching angle is between a crystallographic axis of the optically nonlinear crystal and the fundamental beam.

8. The optical amplifier apparatus as in claim 1, wherein the seed wavelength and the second phase-matching angle are varied synchronously.

9. The optical amplifier apparatus as in claim 1, wherein the seed wavelength is varied.

10. The optical amplifier apparatus as in claim 1, wherein the fundamental beam has a wavelength of about 1035 nm.

11. The optical amplifier apparatus as in claim 10, wherein the optically nonlinear crystal is made of BBO and the first phase matching angle is about 13.2°.

12. The optical amplifier apparatus as in claim 10, wherein the optically nonlinear crystal is made of LBO and the first phase matching angle is about 23.3°.

13. The optical amplifier apparatus as in claim 1, wherein the fundamental beam is a series of ultrashort pulses.

14. The optical amplifier apparatus as in claim 1, wherein the seed wavelength is about 740 nm.

15. The optical amplifier apparatus as in claim 1, wherein the seed wavelength is about 680 nm.

16. The optical amplifier apparatus as in claim 1, further comprising:
a first mirror, the optically nonlinear crystal and the first mirror located on an axis of rotation; and
a second mirror and a third mirror, the axis of rotation and the first, second and third mirrors located in a common plane, the fundamental beam propagating along the axis of rotation onto the first mirror, the fundamental beam reflected by the first, second and third mirrors and thereby directed onto an input surface of the optically nonlinear crystal, the optical amplifier continuously tuned by varying the seed wavelength while synchronously rotating the optically nonlinear crystal and the first, second, and third mirrors together about the axis of rotation.

17. The optical amplifier apparatus as in claim 16, wherein the second phase-matching angle is a non-collinear angle between the fundamental beam and the seed beam.

18. The optical amplifier apparatus as claim 1, wherein the fundamental beam is a chirped pulse.

19. A method of amplifying laser light comprising the steps of:
directing a beam of laser light having a fundamental wavelength into an optically nonlinear crystal at a first phase matching angle for converting the fundamental wavelength light into second harmonic wavelength light; and
directing a seed laser beam having a wavelength longer that the second harmonic wavelength light into the nonlinear crystal at a second phase matching angle selected to cause optical parametric generation to occur wherein a portion of the second harmonic wavelength light is converted to a signal laser beam having the wavelength of the seed laser beam and a separate idler laser beam.

* * * * *